US006742825B1

(12) United States Patent
Macaulay

(10) Patent No.: US 6,742,825 B1
(45) Date of Patent: Jun. 1, 2004

(54) BOX AND VEHICLE BED LINER

(76) Inventor: Jimmy Macaulay, 5048 Ponderosa La., West Palm Beach, FL (US) 33415

( * ) Notice: Subject to any disclaimer, the term of this patent is extended or adjusted under 35 U.S.C. 154(b) by 0 days.

(21) Appl. No.: 10/404,532

(22) Filed: Apr. 2, 2003

(51) Int. Cl.[7] ................................................ B60N 3/12
(52) U.S. Cl. ...................................... 296/37.6; 296/39.2
(58) Field of Search ............................ 296/37.6, 39.1, 296/39.2, 40, 43, 37.1

(56) References Cited

U.S. PATENT DOCUMENTS

| D271,009 S | * | 10/1983 | Fishler | 296/39.2 |
| 4,740,026 A | | 4/1988 | Wagner | |
| 4,848,346 A | * | 7/1989 | Crawford | 607/37 |
| 4,958,876 A | * | 9/1990 | Diaco et al. | 296/39.2 |
| 5,137,322 A | * | 8/1992 | Muirhead | 296/39.2 |
| 5,154,478 A | * | 10/1992 | Erickson et al. | 296/39.2 |
| D336,063 S | * | 6/1993 | Stallings | D12/221 |
| 5,259,712 A | * | 11/1993 | Wayne | 410/152 |
| 5,366,124 A | * | 11/1994 | Dearborn, IV | 296/37.6 |
| 5,494,315 A | * | 2/1996 | Heltenburg | 296/37.6 |
| 5,524,951 A | * | 6/1996 | Johnson | 296/37.6 |
| 5,597,193 A | * | 1/1997 | Conner | 296/37.6 |
| 5,628,442 A | * | 5/1997 | Wayne | 224/543 |
| 5,657,916 A | * | 8/1997 | Tackett | 296/37.6 |
| 5,685,468 A | | 11/1997 | Niemi et al. | |
| 5,720,507 A | * | 2/1998 | Emery | 296/39.2 |
| 5,893,599 A | * | 4/1999 | Strohfeldt | 296/37.6 |
| 5,967,392 A | * | 10/1999 | Niemi et al. | 224/404 |
| 6,007,128 A | * | 12/1999 | Hines, Jr. | 296/37.6 |
| 6,022,061 A | * | 2/2000 | Emery et al. | 296/39.2 |
| 6,053,563 A | | 4/2000 | Edgeller et al. | |
| 6,068,319 A | * | 5/2000 | O'Brien | 296/37.6 |
| 6,120,076 A | * | 9/2000 | Adsit et al. | 296/37.6 |
| 6,170,724 B1 | * | 1/2001 | Carter et al. | 296/37.6 |
| 6,170,896 B1 | * | 1/2001 | Harris et al. | 296/3 |
| 6,170,897 B1 | * | 1/2001 | Karrer | 296/39.2 |
| 6,176,657 B1 | * | 1/2001 | Romph | 410/94 |
| 6,203,090 B1 | | 3/2001 | Vitoorapakorn | |
| 6,241,137 B1 | | 6/2001 | Corr | |
| 6,254,162 B1 | * | 7/2001 | Faber et al. | 296/37.6 |
| 6,276,735 B1 | * | 8/2001 | Champion | 296/37.6 |
| 6,349,865 B1 | * | 2/2002 | Tolley et al. | 296/37.6 |
| 6,460,744 B2 | * | 10/2002 | Lance et al. | 296/37.6 |
| 6,471,278 B2 | * | 10/2002 | Leitner et al. | 296/37.6 |
| 6,478,355 B1 | * | 11/2002 | Van Eden et al. | 296/37.6 |
| 6,499,434 B1 | * | 12/2002 | Tyler | 296/37.6 |
| 6,571,949 B2 | * | 6/2003 | Burrus et al. | 296/37.1 |
| 2003/0089711 A1 | * | 5/2003 | Grattan | 220/4.22 |

FOREIGN PATENT DOCUMENTS

| JP | 4-218443 | 8/1992 |
| JP | 7-246958 | 9/1995 |

* cited by examiner

Primary Examiner—Kiran Patel
(74) Attorney, Agent, or Firm—Richard C. Litman

(57) ABSTRACT

A truck bed liner and a removable storage box combination comprising a bed liner and at least one box. The bed liner has internal sides defining opposite facing docking members. The at least one box comprises a lid, and opposite ends defining complementary docking members adapted to dock with the opposite facing members located on the internal sides of the bed liner. An optional internal reversible securing mechanism is located inside the at least one box that is accessible when the at least one box lid is open. The optional internal reversible securing mechanism moves from a box secure position to a box release position thus reversibly securing the at least one box to the truck bed liner. An optional external locking mechanism reversible locks the lid of the at least one box.

16 Claims, 5 Drawing Sheets

BOX AND VEHICLE BED LINER

BACKGROUND OF THE INVENTION

1. Field of the Invention

The present invention relates to a box and vehicle bed liner combination, and more particularly to a removable storage box and truck bed liner combination, wherein the box can be reversibly secured to at least one position inside the bed liner.

2. Description of Related Art

Vehicles such as pickup trucks are widely used as work vehicles and personal use vehicles. A pickup truck has a bed to carry a load. The bed of the truck often comprises a painted metal surface which is vulnerable to chipping and general wear and tear. In order to prevent loads cargo from damaging the painted metal surface of the truck bed a protective bed liner is fitted to the pick-up truck.

Several efforts have been made to address these and other problems. U.S. Design Pat. No. 271,009 ("the '009 patent") shows a combined truck bed liner and tool chest. The '009 tool chest abuts against but does not fit inside the '009 bed liner. In addition, the '009 box position is essentially fixed because it abuts against the outer surface of the front end of the truck liner and so its position can not be varied with respect to the interior of the '009 truck liner. Thus, the '009 patent teaches away from the present invention.

U.S. Design Pat. No. 336,063 ("the '063 patent") also shows a combined bed liner and tool storage container wherein the '063 container has an essentially fixed position with respect to the '063 bed liner.

U.S. Pat. No. 5,137,322 ("the '322 patent") shows an assembly for installation into the bed of a pickup truck consisting of a cargo chest and a liner insert combination. The '322 chest is has an essentially fixed position with respect to the '322 bed liner.

U.S. Pat. No. 6,007,128 ("the '128 patent") shows carry-all box for use in combination with a vehicle bed. The '128 patent discloses a carry-all box for use in combination with vehicle bed. The '128 patent incorporates a pivot mechanism to enable the '128 box to pivot in an arc path. The '128 patent does not teach or suggest a box in combination with a bed liner as claimed in the present invention.

U.S. Pat. No. 5,154,478 ("the '478 patent") discloses a liner for use in a pickup truck wherein the liner has integral storage compartments. The '478 patent teaches away from the present invention wherein the storage compartments are integrated. Specifically, the '478 patent does not teach or suggest a bed liner and box combination, as claimed in the present invention, wherein at least one storage container is reversibly secured at a desired location in the truck liner.

U.S. Pat. No. 5,685,467 ("the '467 patent") discloses a box for use in the cargo bed of a pick-up truck. The '467 box includes spaced apart legs that provide a space beneath the box to accommodate sheet materials and that are hollow to provide drainage. The '467 patent does not teach or suggest a bed liner and box combination, as claimed in the present invention, wherein at least one storage container is reversibly secured at a desired location in the truck liner.

U.S. Pat. No. 6,053,563 ("the '563 patent") discloses an enclosure for holding a machine, the '563 enclosure includes a lower body made of polymer, and an upper body overlying the lower body for enclosing the machine between the upper and lower bodies. The '563 patent does not teach or suggest a bed liner and box combination, as claimed in the present invention, wherein at least one storage container is reversibly secured at a desired location in the truck liner.

Other U.S. patents in the field of containers and/or bed liners, but which do not solve the above mentioned problems include U.S. Pat. Nos. 6,170,724 B1, 6,203,090 B1, 6,241,137 B1, 6,276,735 B1, 6,460,744 B2, and 6,471,278 B2.

Foreign patents in the field of containers and/or bed liners, but which do not solve the above mentioned problems include Japanese Patent Nos. 4-218443, and 7-246958.

None of the above inventions and patents, taken either singly or in combination, is seen to describe the instant invention as claimed.

SUMMARY OF THE INVENTION

The present invention relates to a box and vehicle bed liner combination, and more particularly to a removable storage box and truck bed liner combination, wherein the box can be reversibly secured to at least one position inside the bed liner.

The truck bed liner and a removable storage box combination comprises a bed liner and at least one box. The bed liner has internal sides defining opposite facing docking members. The at least one box comprises a lid, and opposite ends defining complementary docking members adapted to dock with the opposite facing members located on the internal sides of the bed liner. An optional internal reversible securing mechanism is located inside the at least one box that is accessible when the at least one box lid is open. The optional internal reversible securing mechanism moves from a box secure position to a box release position thus reversibly securing the at least one box to the truck bed liner. An optional external locking mechanism reversible locks the lid of the at least one box.

Accordingly, it is a principal object of the invention to provide a truck bed liner and box combination.

It is another object of the invention to provide a bed liner and box combination, wherein the box is securely attached to the liner to prevent theft and yet can be easily removed from the liner under the direction of a legitimate truck operator.

It is a further object of the invention to provide a bed liner and box combination, wherein more than one box can be securely fastened to the bed liner.

It is still another object of the invention to provide a bed liner and at least one box combination, wherein the at least one box can be securely fastened to, and removed from, different locations in the bed liner.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
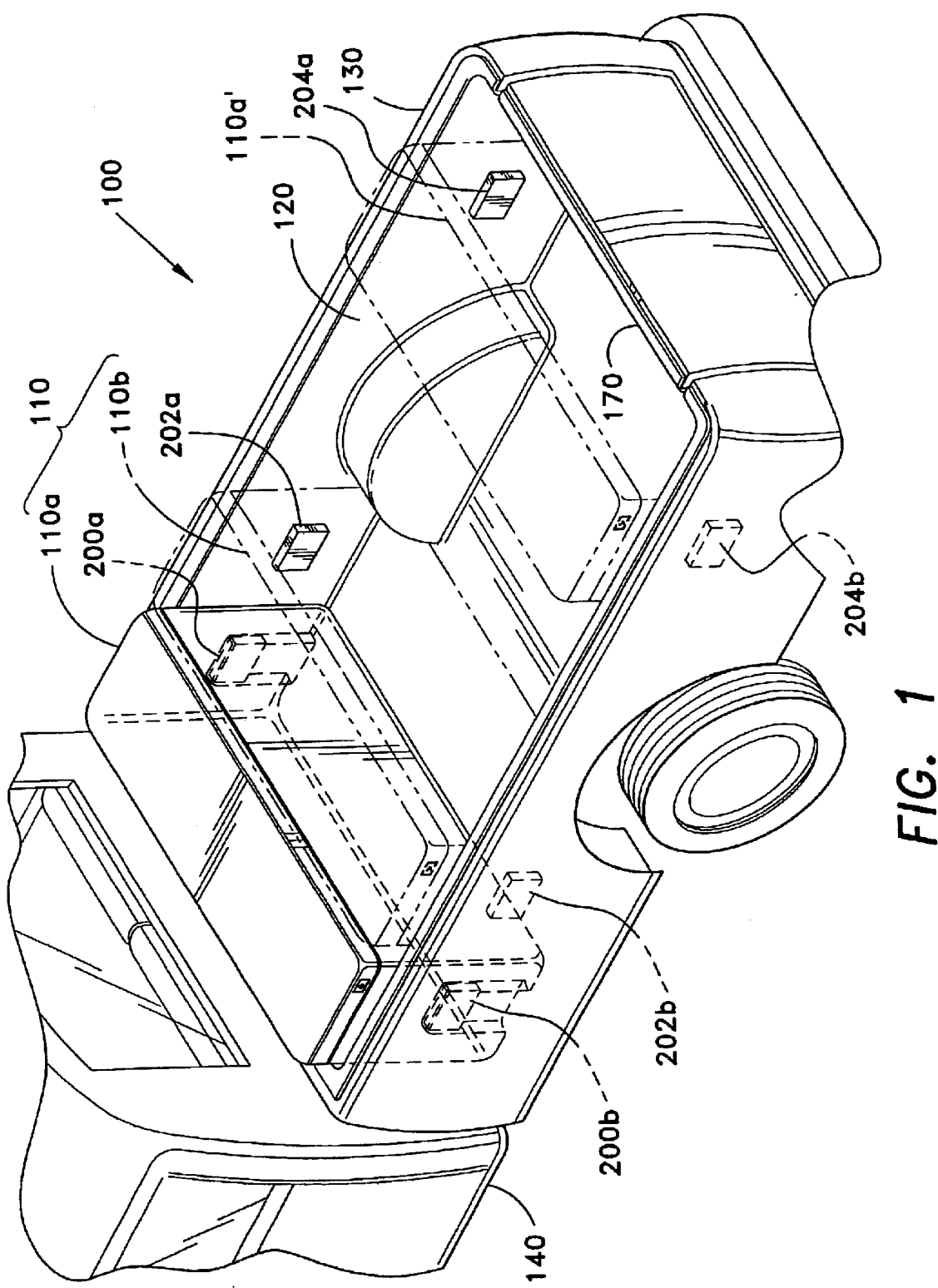
FIG. 1 is an environmental, perspective view of a bed liner and at least one box combination according to the present invention.

The present invention relates to a box and vehicle bed liner combination, and more particularly to a removable storage box and truck bed liner combination, wherein the box can be reversibly secured to at least one position inside the bed liner.

Broadly, the truck bed liner and a removable storage box combination comprises a bed liner and at least one box. The bed liner has internal sides defining opposite facing docking members. The at least one box comprises a lid, and opposite ends defining complementary docking members adapted to dock with the opposite facing members located on the internal sides of the bed liner. An optional internal reversible securing mechanism is located inside the at least one box that is accessible when the at least one box lid is open. The optional internal reversible securing mechanism moves from a box secure position to a box release position thus reversibly securing the at least one box to the truck bed liner. An optional external locking mechanism reversible locks the lid of the at least one box.

In normal use, the truck bed liner lines the bed of a truck, i.e. the host truck. Thus, to illicitly remove the at least one box from the truck bed liner, and hence from the host truck, requires either stripping of the bed liner from the host truck or breaking into the at least one box to move the internal reversible securing mechanism to a box release position thereby allowing the at least one box to be removed from the bed liner and hence from the host truck; such an act would entail either breaking a side or lid of the at least one box. It will be understood that the terms "host truck bed", "host bed", "cargo bed", "vehicle bed", "truck bed", and "pick-up truck bed" are hereinafter regarded as equivalent terms.

Referring generally to the figures, the vehicle bed liner and box combination is denoted by the reference numeral 100 as a whole. Broadly, the vehicle bed liner and box combination 100 comprises at least one box 110 (shown as 110a and 110b in FIG. 1) and a bed liner 120. The bed liner 120 is adapted to fit inside a host bed such as the cargo bed 130 of a pick-up truck 140. The bed liner 120 may be attached to the cargo bed 130 of a vehicle by conventional means well known in the art of truck bed liners. Though it is not essential it is preferred that the bed liner 120 is securely affixed to the truck bed, e.g. using bolts, screws, or pins such as actuator pins to attach the bed liner 120 to bore holes drilled into the host truck bed 130 as described, for example, in U.S. Pat. No. 4,740,026 (issued Apr. 26, 1988); the '026 is herein incorporated by reference in its entirety.

Figure 2:
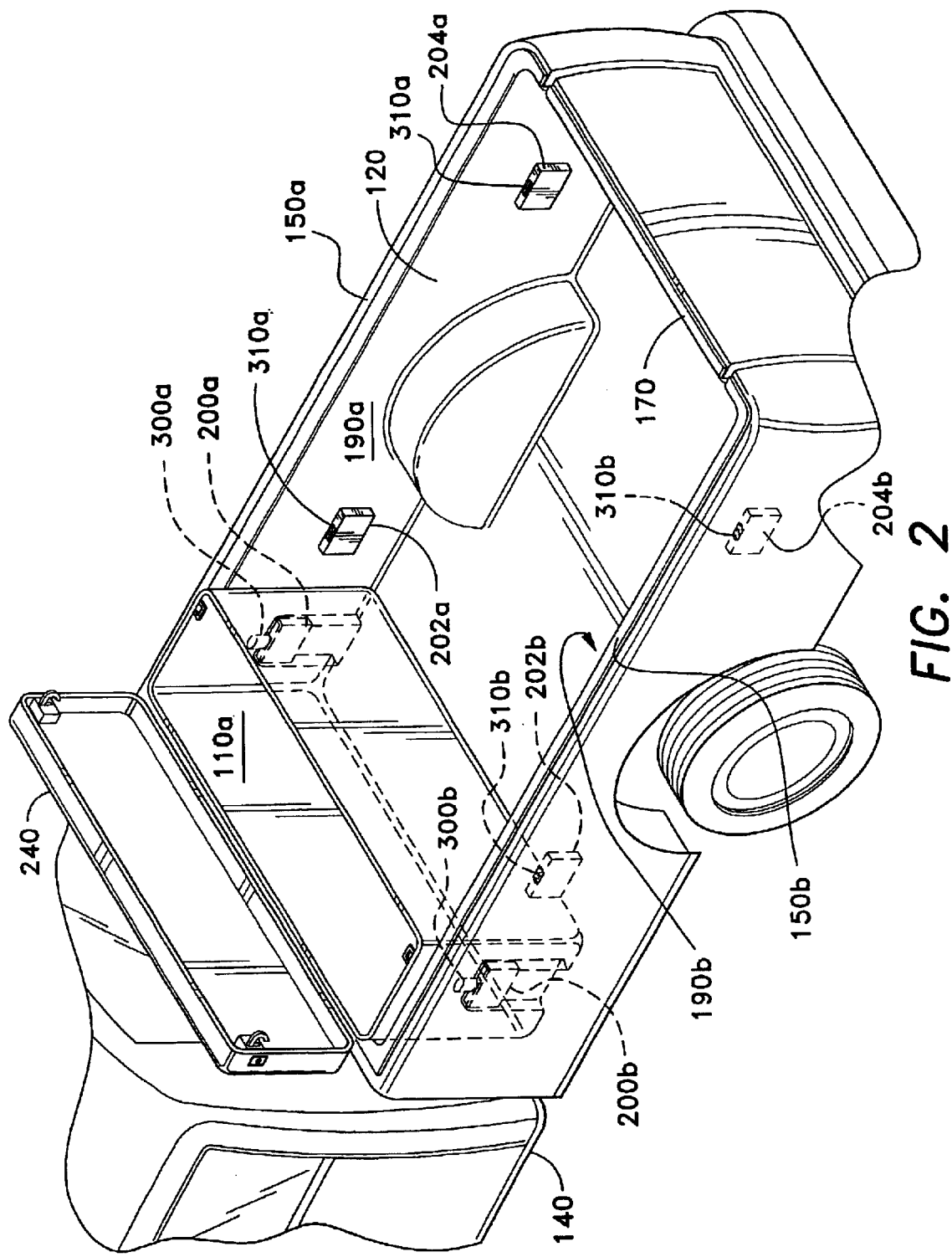
FIG. 2 is a perspective view of a bed liner and a box combination with an internal reversible securing mechanism according to the present invention.

In the first embodiment of the present invention the vehicle bed liner and box combination 100 comprises a bed liner 120 and a box 110a (see e.g., FIG. 2). The bed liner 120 comprises a first 150a and second 150b opposite sides, a front end 160, an optional tail-gate end 170, and a base 180, wherein the first 150a and second 150b opposite sides respectively have a first 190a and a second 190b opposite facing internal surfaces, wherein the first 190a and second 190b internal surfaces respectively define docking members shown as a first 200a and a second 200b opposite facing male members (see e.g., FIGS. 2 and 5).

Still referring to the first embodiment of the present invention, the box 110a (see e.g., FIG. 5) is of generally rectangular shape and comprises a first 210a and second 210b opposite box ends, a first 220 and second 222 opposite box sides, a box base 230 and a box lid 240 that can move between an open and a closed position, wherein the first 210a and second 210b opposite ends each respectively comprise a first 250a and second 250b exterior surface, wherein the first 250a and second 250b exterior surfaces respectively define complementary docking members shown as a first 260a and a second 260b female member, wherein the female members 260a and 260b are respectively adapted to reversibly dock with the male members 200a and 200b. The first 190a and second 190b internal surfaces may optionally respectively define additional opposite facing male members, e.g. 202a and 202b, and 204a and 204b (see FIG. 3), whereby the box 110a may be docked in a different location inside the bed liner 120 to, for example, male docking members 204a and 204b as shown in FIG. 1 (shown in phantom as 110a'); the truck driver can use a further box 110b to store a load between the box 110b and the front end 160 of the bed liner 120 thus limiting the movement of a load about the truck bed 130.

It should be understood that the male members may individually or separately take the form of female members; likewise, the female members may individually or separately take the form of male members. For example, the male members 200a and a second 200b may take the form of female members and complementary female members 260a and 260b may take the form of complementary male members. Thus, the exact form of the male and female members may vary without detracting from the spirit of the present invention.

Figure 3:
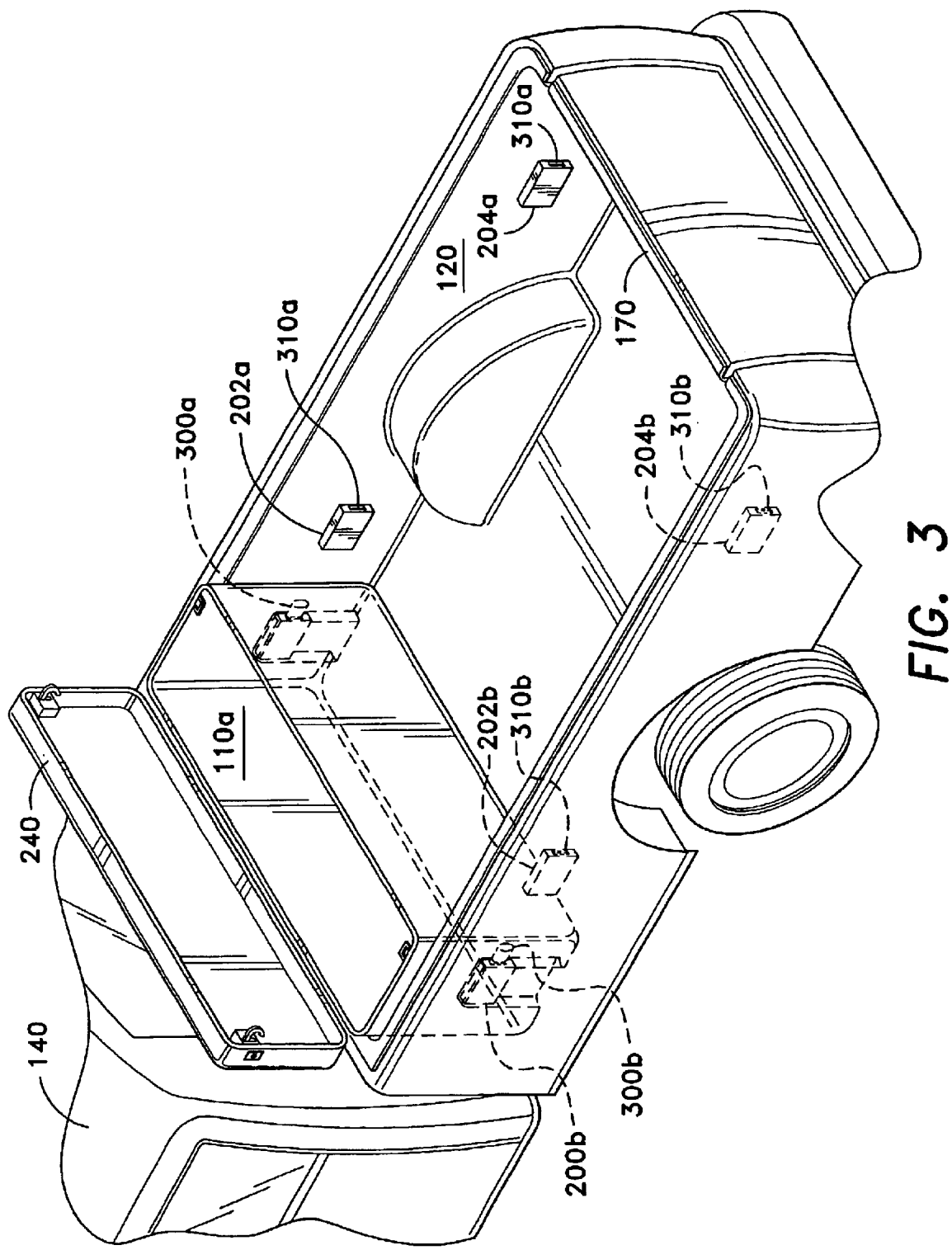
FIG. 3 is a perspective view of a bed liner and a box combination with an alternative arrangement of the internal reversible securing mechanism of FIG. 2.
Figure 4:
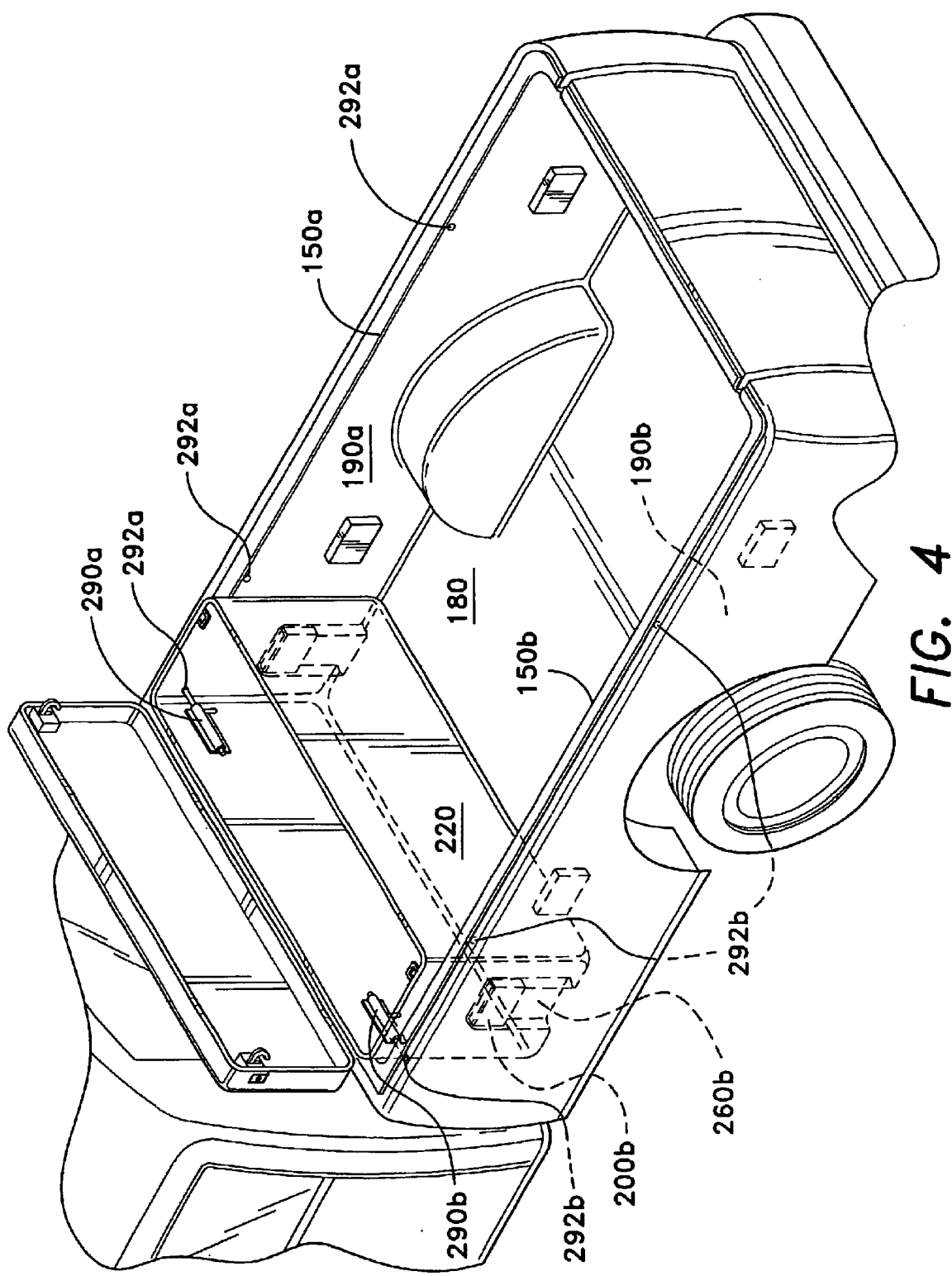
FIG. 4 is a perspective view of a bed liner and a box combination with a further alternative arrangement of the internal reversible securing mechanism of FIG. 2.

Still referring to the first embodiment of the present invention, an optional internal reversible securing mechanism is located inside the box 110a and in operable communication with the bed liner 120 to reversibly secure the box 110a to the bed liner 120. It will be understood that the optional internal reversible securing mechanism can take various forms such as, for example, latch bolts 290a and 290b (see FIG. 4) that reversibly secures the box 110a to the bed liner 120; more specifically, the latch bolts 290a and 290b respectively operably communicate with any one of at least one latch bolt hole 292a and 292b drilled respectively into the sides 190a and 190b of the bed liner 120 (see FIG. 4). Alternatively, the internal reversible securing mechanism can, for example, take the form of at least one catch 300a and 300b located in the box 110a, but also in operable communication with male members 220a and 220b, respectively; wherein the male members 220a and 220b respectively comprise complementary female catch openings 310a and 310b to accommodate the catches 300a and 300b (see FIGS. 2 and 3). The catches 300a and 300b, and complementary catch openings 310a and 310b, may be mounted in any orientation such as vertically mounted, as shown in FIG. 2, or side-mounted as shown in FIG. 3. While the internal reversible securing mechanism is optional it is preferred in order to discourage illicit removal of the box 110a from the bed liner 120 (and hence from the truck 140).

Figure 5:
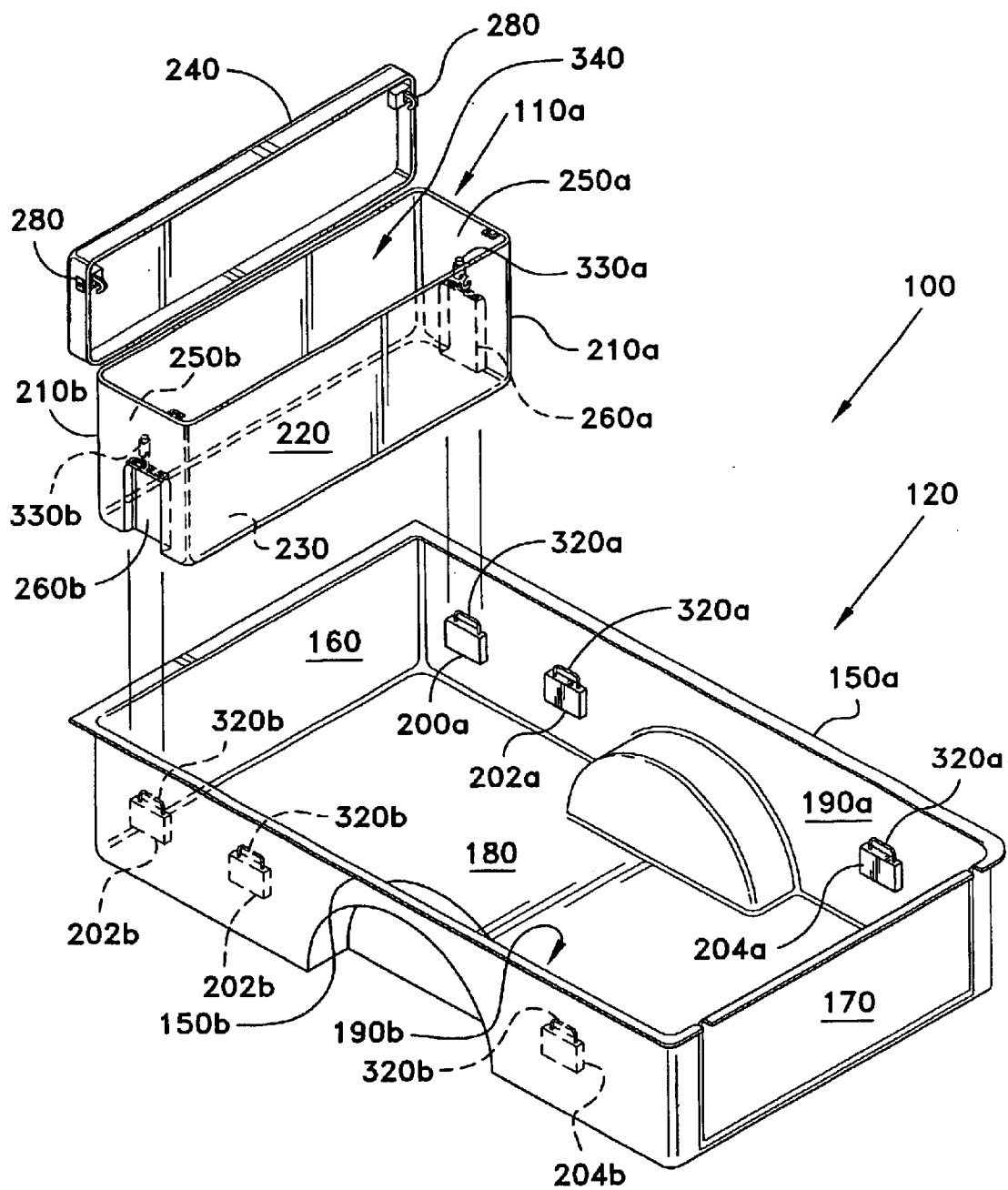
FIG. 5 is a partly exploded perspective view of a bed liner and a box combination with an external locking mechanism according to the present invention.

Still referring to the first embodiment of the present invention, an optional external locking mechanism is used to reversibly secure the lid 240 to the box 110a; an example of an external locking mechanism is shown in FIG. 5 where the external locking mechanism takes the form of a recessed padlock 280; however, the external locking mechanism can take the form of any type of suitable padlock or equivalent locking device. While the external locking mechanism is optional is preferred in order to prevent the illicit opening of the box lid 240. It should be understood that the optional internal and external locking mechanisms are not limited to the sole embodiments described above and may take any suitable form.

Still referring to the first embodiment, the box 110*a* can be removed easily from the bed liner 120 by opening the lid 240 and moving the internal reversible securing mechanism to a box release position in order to allow easy removal of the box 110*a* from the bed liner 120. The box 110*a* can be placed into the bed liner 120 by aligning the first 260*a* and a second 260*b* female members respectively with the first 200*a* and second 200*b* male members and lowering the box into the bed liner 120. Optional additional male members 202*a* and 204*a* may be placed along the side 150*a*, and more male members 202*b* and 204*b* along the side 150*b* in order to allow the truck driver to reversibly secure the box at various positions inside the bed liner 120 (e.g., shown in phantom outline in e.g. FIG. 5).

In a second embodiment of the present invention the vehicle bed liner and box combination 100 comprises a plurality of opposite facing male members 200*a*/200*b*, 202*a*/202*b*, 204*a*/204*b* (see FIG. 5) respectively along the internal surfaces 190*a* and 190*b* of the bed liner 120. At least one box 110 can be docked to various parts of the bed liner 120 as shown, for example, in FIG. 1.

In more detail, the second embodiment of the present invention the vehicle bed liner and box combination 100 comprises at least one box 110 located in a bed liner 120. The first internal surface 190*a* defines a first plurality of male members shown in e.g., FIG. 3 as 200*a*, 202*a* and 202*c*; the second internal surface 190*b* defines a second plurality of male members 200*b*, 202*b* and 204*b*. The first and second plurality of male members face each other. The at least one box 110 The first 260*a* and 260*b* second female members are respectively adapted to reversibly dock with any one of the plurality of male members along the internal surfaces 190*a* and 190*b*.

Still referring to the second embodiment, the optional reversible securing mechanism is located inside the at least one box 110 and in operable communication with the bed liner 120 to reversibly secure the box 110*a* to the bed liner 120. The reversible securing mechanism can take various forms such as easy to operate latch bolts 290*a* and 290*b* (see FIG. 4) that secures the at least one box 110 to the bed liner 120; for example, the latch bolt 290*a* can dock with any one of at least one latch bolt holes 292*a* drilled into the side 190*a* of the bed liner 120; the latch bolt 290*b* can dock with any one of at least one latch bolt holes 292*b* drilled into the side 190*b* of the bed liner 120. Alternatively, the internal reversible securing mechanism can take the form of, for example, at least one catch 300*a* and 300*b* in operable communication with male members 220*a* and 220*b*, respectively, as shown in FIGS. 2 and 3. While the internal reversible securing mechanism is optional it is preferred in order to discourage illicit removal of the at least one box 110 from the bed liner 120 (and hence from the truck 140).

In the second embodiment the at least one box 110 can be removed easily from the bed liner 120 by opening the lid 240 of the at least one box and, if present, operating the reversible securing mechanism to release the at least one box from the bed liner 120. The at least one box 110 can be easily mated to the bed liner 120 by docking the first and second female members 260*a* and 260*b* respectively with a male member of the first (200*a*, 202*a*, 204*a*) and second (200*b*, 202*b*, 204*b*) plurality of male members.

The bed liner 120 is preferably made of a durable polymer such as, but not limited to: acrylonitrile butadiene styrene (ABS), polycarbonate, polyolefins, or a combination thereof. Alternatively, the bed liner 120 may be made of wood or partly in wood and another suitable material such as appropriately sized plastic sheets (e.g., sheets made of ABS). The at least one box 110 may be made of any suitable material such as metal, plastic, wood, or a combination thereof.

In a further embodiment, at least one male member 200*a*, 202*a*, 200*b*, and 202*b* optionally comprise a U-bracket 320 (shown as 320*a* and 320*b* in FIG. 5). Optional U-bracket grips 330 (shown as 330*a* and 330*b* in FIG. 5) are partly disposed in the complementary female docking members 260*a* and 260*b* partly penetrate into the box interior 340. The box 110*b* is reversibly locked to the truck liner 120 by pushing at least one of the U-bracket grips 330 into the female docking member to snare at least one of the U-brackets 320. To release the box 110*b*, a truck operator pulls at least one U-bracket grips 330 back into the box interior 340 thus removing the obstruction to the U-bracket 320 and thereby allowing the removal of the box 110*b* from the truck bin liner 120.

It is to be understood that the present invention is not limited to the sole embodiments described above, but encompasses any and all embodiments within the scope of the following claims.

I claim:

1. A vehicle bed liner and a box combination, comprising:
   a bed liner comprising a first and second opposite sides, a front end, and a base, wherein the first and second opposite sides respectively have a first and a second internal surface, wherein the first and second internal surface respectively define a first and a second internal surface docking member, whereby the first and second internal surface docking members are opposite each other;
   a box of generally rectangular shape comprising a first and second opposite ends, a first and second opposite sides, a base and a lid that can move between an open and a closed position, wherein the first and second opposite ends of the box each respectively comprise a first and second exterior surface, wherein the first and second exterior surface respectively define a first and a second exterior surface docking member, wherein the first exterior surface docking member reversibly docks with the first interior surface docking member and the second exterior surface docking member reversibly docks with the second interior surface docking member;
   an internal reversible securing mechanism located inside the box and in operable communication with the first and second internal surface docking members of the bed liner to reversibly secure the box to the bed liner; and
   an external locking mechanism to reversibly secure the lid to the box,
   whereby the box can be removed easily from the bed liner by opening the lid of the box and operating the reversible securing mechanism to release the box from the bed liner, and further whereby the box can be placed easily into the bed liner by aligning the first and second exterior surface docking members with the first and second interior surface docking members and lowering the box into the bed liner to place the box in the bed liner.

2. The vehicle bed liner and a box combination of claim 1, wherein the first and second internal surface docking members are male, and wherein the first and a second exterior surface docking members are female.

3. The vehicle bed liner and a box combination of claim 1, wherein the first and second internal surface docking members are female, and wherein the first and a second exterior surface docking members are male.

4. The vehicle bed liner and a box combination of claim 1, wherein the internal reversible securing mechanism comprises a catch.

5. The vehicle bed liner and a box combination of claim 1, wherein the internal reversible securing mechanism comprises a U-bracket grip, and wherein at least one of the first and second exterior surface docking members comprise a U-bracket, wherein the U-bracket grip is adapted to reversibly secure the U-bracket.

6. The vehicle bed liner and a box combination of claim 1, wherein the external locking mechanism is a padlock.

7. The vehicle bed liner and a box combination of claim 1, wherein the external locking mechanism is a recessed padlock.

8. A vehicle bed liner and at least one box combination, comprising:
   a bed liner comprising a first and second opposite sides, a front end, and a base, wherein the first and second opposite sides respectively have a first and a second internal surface, wherein the first internal surface defines a first plurality of male members, and the second internal surface defines a second plurality of male members, whereby the first and second plurality of male members are aligned to face each other;
   at least one box of generally rectangular shape comprising a first and second opposite ends, a first and second opposite sides, a base and a lid that can move between an open and a closed position, wherein the first and second opposite ends of the at least one box each respectively comprise a first and second exterior surface, wherein the first and second exterior surface respectively define a first and a second female member, wherein the first female member reversibly docks with a male member of the first plurality of male members, and the second female member reversibly docks with a male member of the second plurality of male members;
   an internal reversible securing mechanism located inside each of the at least one box and in operable communication with the first and second male members of the bed liner to reversibly secure the at least one box to the bed liner via the first and second female members; and
   an external locking mechanism to reversibly secure the lid to the at least one box,
   whereby the at least one box can be removed easily from the bed liner by opening the lid of the at least one box and operating the reversible securing mechanism to release the at least one box from the bed liner, and further whereby the at least one box can be easily mated to the bed liner by docking the first and second female members respectively with a male member of the first and second plurality of male members.

9. The vehicle bed liner and a box combination of claim 8, wherein the internal reversible securing mechanism comprises a catch.

10. The vehicle bed liner and a box combination of claim 8, wherein the internal reversible securing mechanism comprises a U-bracket grip, and wherein at least one of the first and second male members comprise a U-bracket, wherein the U-bracket grip is adapted to reversibly secure the U-bracket.

11. The vehicle bed liner and a box combination of claim 8, wherein the external locking mechanism is a padlock.

12. The vehicle bed liner and a box combination of claim 8, wherein the external locking mechanism is a recessed padlock.

13. The vehicle bed liner and a box combination of claim 4, wherein each catch is vertically disposed in the box adjacent the external docking member, and each catch communicates through the external docking member to engage the internal docking member.

14. The vehicle bed liner and a box combination of claim 4, wherein each catch is horizontally disposed in the box adjacent the external docking member, and each catch communicates through the external docking member to engage the internal docking member.

15. The vehicle bed liner and a box combination of claim 9, wherein each catch is vertically disposed in the box adjacent to the female docking member, and communicates through the female docking to engage the male docking member.

16. The vehicle bed liner and a box combination of claim 9, wherein each catch is horizontally disposed in the box adjacent to the female docking member, and communicates through the female docking to engage the male docking member.

* * * * *